J. D. PETTIT.
ANIMAL TRAP.
APPLICATION FILED MAY 11, 1909.
938,397.
Patented Oct. 26, 1909.
2 SHEETS—SHEET 1.
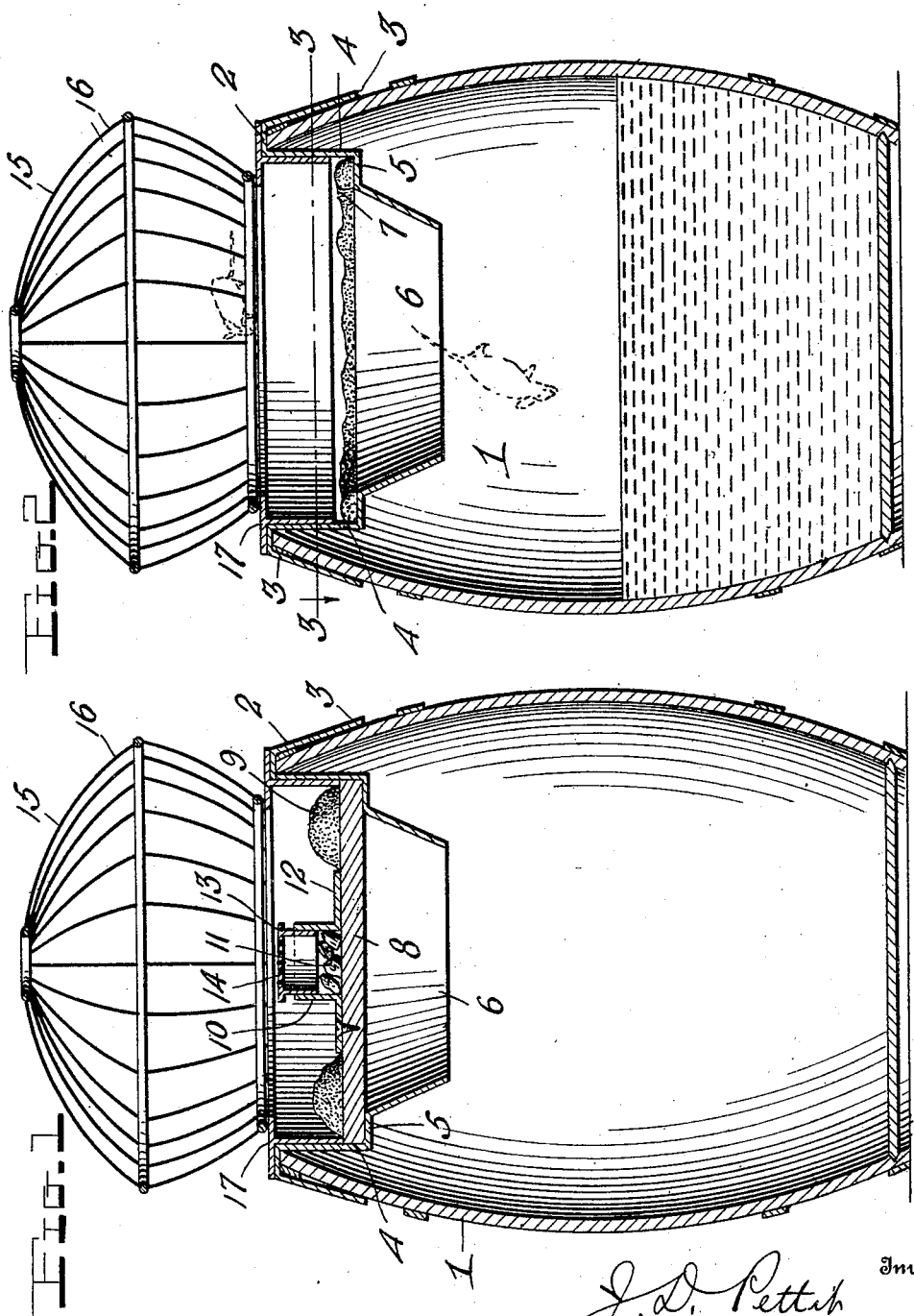

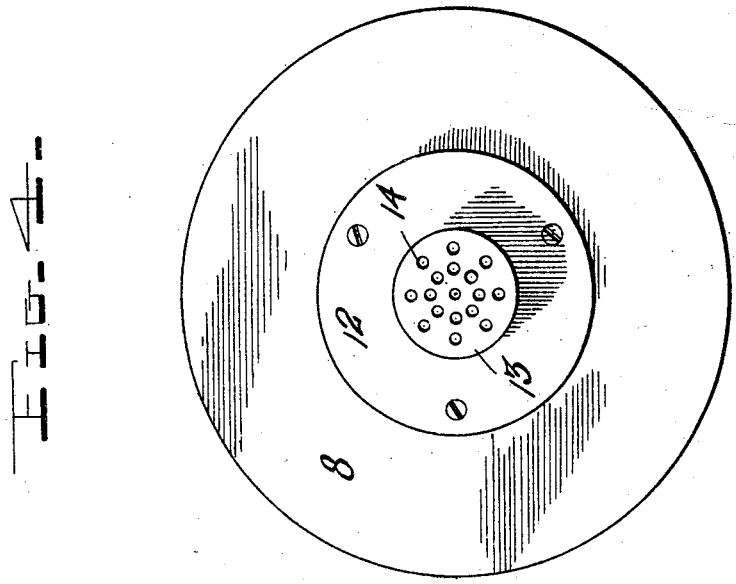
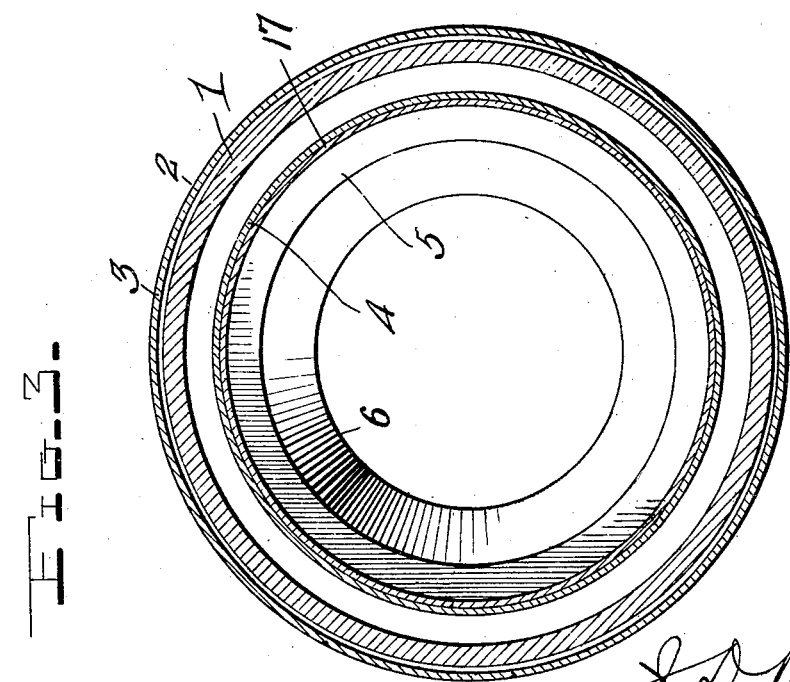

UNITED STATES PATENT OFFICE.

JAMES D. PETTIT, OF ST. LOUIS, MISSOURI.

ANIMAL-TRAP.

938,397.  Specification of Letters Patent.  Patented Oct. 26, 1909.

Application filed May 11, 1909. Serial No. 495,293.

*To all whom it may concern:*

Be it known that I, JAMES D. PETTIT, a citizen of the United States, residing at St. Louis, in the State of Missouri, have invented certain new and useful Improvements in Animal-Traps, of which the following is a specification, reference being had to the accompanying drawings.

This invention relates to improvements in animal traps and more particularly those designed for catching rats.

The object of the invention is to provide a simple, practical and effective device of this character which may be used in connection with an ordinary barrel or similar receptacle adapted to contain water in which the rats are drowned as soon as caught.

With the above and other objects in view, the invention consists of the novel features of construction and the combination and arangement of parts hereinafter fully described and claimed, and illustrated in the accompanying drawings, in which—

Figure 1 is a sectional view through my improved rat trap showing the temporary bait holder therein; Fig. 2 is a similar view showing such holder removed; Fig. 3 is a horizontal section taken on the plane indicated by the line 3—3 in Fig. 2; and Fig. 4 is a plan view of the removable bait holder.

In the drawings 1 denotes a barrel or other receptacle adapted to contain water, as shown in Fig. 2. The trap comprises an open body 2 preferably of circular shape to rest upon the top of the barrel 1 and to be retained thereon by an annular depending flange 3, as shown. Said body resembles a cover for the barrel and has depending from its top portion and arranged within the barrel an annular flange or wall 4 at the bottom of which is an inwardly extending, horizontally disposed annular ledge 5 from which latter depends a frusto-cone-shaped flange 6.

The ledge 5 is adapted to support bait such as bran, meal or the like shown at 7 in Fig. 2 and it is also adapted to support a temporary or removable bait holder 8 in the form of a circular plate or disk. This temporary bait holder 8 covers the cone 6 and is adapted to support a large quantity of bait such as bran or meal indicated at 9, on which the rats may feed to attract them to the trap. If desired, a receptacle 10 may be provided on the center of the top of the holder 8 to receive cheese, musk or other bait 11 which has a strong odor and which will attract rats. Said receptacle or holder 10 is cylindrical in form and has a flanged base 12, screwed or otherwise secured to the holder 8 and its open top is closed by a removable cover 13, the top of which is perforated as at 14.

For the purpose of preventing cats, chickens or the like from falling into the barrel, I may employ a removable guard 15 which consists of an open body portion 16 made of wire and attached to a rim portion or member 17 having a depending flange to enter the body 2 of the trap and an outwardly projecting horizontal flange to rest upon the top of said body 2. The openings in the wire or basket-like body 16 of the guard are of such size as to permit a rat to pass therethrough but to exclude chickens, cats and the like.

In using my improved trap it is baited for a few nights, as shown in Fig. 1, so that the rats will be allowed to feed upon the bait placed on the temporary cover or holder 9 until they are accustomed to coming to the barrel or receptacle 1 for food. After they have been allowed to feed for a few nights, the holder 8 is removed and bran or other bait is placed on the ledge 5 and water is placed in the barrel, as shown in Fig. 2. When the trap is thus set the rats will be attracted by the bran 7 and, in endeavoring to reach the same, will jump down upon the ledge 5 and slip from the latter in the cone flange 6 and drop from this cone into the water in the barrel.

From the foregoing it will be seen that the invention provides an exceedingly simple and practical device of this character which may be used on barrels or other receptacles adapted to contain water.

Having thus described the invention what is claimed is:

1. A device of the character described comprising an open body to rest on the top of a receptacle and having an internal annular shoulder, and a bait holder removably arranged upon said shoulder, said shoulder being adapted to form a support for bait when said holder is removed from the body.

2. A device of the character described comprising an open body to rest on the top of a receptacle, a temporary bait holder removably arranged in the body and adapted to close the opening therein and a ledge in said body adapted to support said bait holder when in the body and to also support bait when said holder is removed.

3. A device of the character described comprising an open body to rest upon the top of a receptacle, a support upon the inner wall of said body, a plate to cover the opening in the body and removably arranged on said support and a foraminous bait holding receptacle upon said plate.

4. A device of the character described comprising an annular body to rest on the top of a receptacle and having a depending outer flange to receive the receptacle and a depending inner wall formed with an annular supporting ledge and a depending cone-shaped flange, said ledge being adapted to support bait.

5. A device of the character described comprising an annular body to rest on the top of a receptacle and having a depending outer flange to receive the receptacle and a depending inner wall formed with an annular supporting ledge and a depending cone-shaped flange, and a temporary bait holder removably arranged on said ledge and adapted to cover the opening in the body, said ledge being also adapted to support bait when the temporary bait holder is removed.

6. A device of the character described comprising an annular body to rest on the top of a receptacle and having a depending outer flange to receive the receptacle, and a depending inner annular wall formed with an annular supporting ledge, and a depending cone-shaped flange, and a guard removably arranged on said body and consisting of an open body portion constructed of wires, and an annular rim portion having a horizontal flange to rest on the top of said body, and a depending annular flange to enter the inner wall of said body.

In testimony whereof I hereunto affix my signature in the presence of two witnesses.

JAMES D. PETTIT.

Witnesses:
H. W. WEILER,
WM. BODE.